United States Patent [19]

Parker, III et al.

[11] Patent Number: 5,319,934
[45] Date of Patent: Jun. 14, 1994

[54] COMBINED GAS TURBINE AND STEAM TURBINE POWER PLANT FOR HIGH EFFICIENCY USE OF LOW GRADE COAL

[75] Inventors: Charles E. Parker, III, Carlisle; T. Gerry Wells, Jr., Attleboro, both of Mass.

[73] Assignee: Pyropower Corporation, San Diego, Calif.

[21] Appl. No.: 926,340

[22] Filed: Aug. 6, 1992

Related U.S. Application Data

[63] Continuation-in-part of Ser. No. 418,180, Oct. 6, 1989.

[51] Int. Cl.$^5$ ............................................. F01K 23/02
[52] U.S. Cl. ......................................... 60/655; 60/676
[58] Field of Search ................................. 60/655, 676

[56] References Cited

U.S. PATENT DOCUMENTS

| | | | |
|---|---|---|---|
| 3,974,642 | 8/1976 | Pacault | 60/655 |
| 4,116,005 | 9/1978 | Willyoung | 60/655 |
| 4,325,311 | 4/1982 | Beranek et al. | 110/245 |
| 4,406,128 | 9/1983 | Fanaritis et al. | 60/655 |
| 4,414,813 | 11/1983 | Knapp | 60/655 |
| 4,424,765 | 1/1984 | Strohmeyer, Jr. | 128/40 |
| 4,479,355 | 10/1984 | Guide et al. | 60/655 |
| 4,686,832 | 8/1987 | Miliaras | 60/676 |
| 4,702,081 | 10/1987 | Vinko | 60/655 |
| 4,769,042 | 9/1988 | Ito et al. | 44/626 |
| 4,839,032 | 6/1989 | Whitlock | 209/3 |
| 4,938,864 | 7/1990 | Frazier et al. | 209/2 |

FOREIGN PATENT DOCUMENTS 0122366 4/1931 Austria .

OTHER PUBLICATIONS

Newspaper Article of Jul. 9, 1989 re Electric Power from Clean Coal Technology–1 page.
Memorandum re Discussion of UFC Coal Cleaning Results & Projected Economics dated Sep. 19, 1988–6 pages.
European Search Report of Application No. 90310286 dated Nov. 15, 1991 & copy of Eur. Pat. #81303757.9–13 pages.

Primary Examiner—Edward K. Look
Assistant Examiner—Mark Sgantzos
Attorney, Agent, or Firm—Baker, Maxham, Jester & Meador

[57] ABSTRACT

A power generating system for processing and converting low grade coal to electrical power comprises apparatus for grinding a stream of coal into fine powder, separating the coal into high grade coal and low grade coal, a suspension burner for burning the high grade coal and generating heat for powering a gas turbine, a circulating fluidized burner for burning the low grade coal for generating heat, and a combination of heat exchangers combining a portion of the heat from the suspension burner with the heat from the circulating bed burner for generating steam for powering a steam turbine.

18 Claims, 4 Drawing Sheets

COMBINED GAS TURBINE AND STEAM TURBINE POWER PLANT FOR HIGH EFFICIENCY USE OF LOW GRADE COAL

REFERENCE TO RELATED APPLICATION

This is a continuation-in-part of our co-pending application Ser. No. 07/418,180, filed Oct. 6, 1989, entitled "A Power System For Separating Coal Into Clean And Dirty Coal And Separately Burning The Fuel In Different Type Combustors And Combining The Energy Output".

BACKGROUND OF THE INVENTION

The present invention relates to power plants, and pertains particularly to a combined gas and steam turbine power plant having a system for maximizing the efficiency and utilization of low grade coal and the like.

There exists in the power generating industry a need for more efficient power plants for converting fossil fuels to electrical power with minimal pollution. The most efficient commercially available technology for power generation systems is the combined cycle gas steam turbine operating on premium fuels. However, the cost and uncertainty of the availability of premium fuels make premium fuel combined cycle power generating plants impractical. Therefore, there exists an even greater need for power plants capable of efficiently handling lower grades of coal that exists in abundance in many regions of the world.

Fossil fuels, particularly coal, are used to power the vast majority of the power plants throughout the world today. Vast reserves of coal exist which cannot be effectively utilized in this and other environmentally sensitive countries without great cost (e.g. the use of expensive equipment with scrubbers). A large percentage of these reserves are contaminated with sulphur and other impurities, which result in undesirable pollution of the environment when burned in a conventional manner. This requires the use of recently developed very expensive and somewhat inefficient equipment to utilize these coal deposits without undue pollution.

Many of these deposits of coal throughout the world are of a very low grade and virtually unusable with present energy conversion systems. These low grade fuels, because of their contamination with impurities, form such a high percentage of non-combustable ash and other pollutants that they are not useable in conventional combustors. While many of these fuels can be burned in fluidized bed combustors, the cost of these combustors are high, the operating temperatures are low, leading to low efficiency and high cost of construction and operation. Moreover, fluidized bed combustion systems are complex and expensive to build, maintain and operate.

Many of the impurities can be removed from the coal through various known coal benefication processes, so that the coal can then be burned in a conventional combustor with minimal scrubbing. These coal benefication processes are normally carried out in a processing plant at the mine, with the purified coal transported to a power plant and the reject left at the mine site. The processes normally begin with crushing and pulverizing the coal into particles of very small size, to free the constituents from one another, and enable them to be at least partially separated from one another. The component containing impurities can be removed from the essentially pure coal particles more economically with recently developed technology, and a substantially clean fuel produced that can be burned in conventional combustors. However, in many cases, this processing approach produces a high percentage of reject and is generally cost prohibitive.

Coal fired power plants are traditionally used to generate steam for powering steam turbines for generating electrical power. Circulating fluidized bed combustors burning low grade coal may be satisfactorily used for steam generation.

Attempts have been made in the past to power gas turbines from coal fuel. These attempts have involved gasification of a portion of the coal to produce a combustible gas for burners of a gas turbine. However, this requires that the combustible gas be clean in order to avoid deposits that clog nozzles and corrode or build deposits on the turbine blades. An example of a plant of this type is disclosed in EPO Publication No. 0 046 406 published 24 Feb., 1982.

Combined cycle power plants having both gas and steam turbines are known. These are primarily to provide flexibility to meet changing load demands and are traditionally fueled by multiple fuels. The steam turbines are typically fueled by coal or oil, and the gas turbines fueled by a premium fuel, such as natural gas or a clean fuel oil.

U.S. Pat. No. 4,686,832, granted to Miliaras on Aug. 18, 1987 proposes cleaning and separating coal at a power plant for powering steam turbines for generating electrical power. A clean component of the coal is fired in a conventional combustor for generating steam for powering the steam generators. The dirty component of the coal is fired in a fluidized bed combustor for preheating feed water. This approach reduces the recirculating fluidized bed combustion system investment normally required for burning low grade coals.

Accordingly, an improved power plant to overcome these problems of the prior art would be desirable.

SUMMARY AND OBJECTS OF THE INVENTION

It is the primary object of the present invention to provide an improved combined cycle gas and steam power plant having a system for separating coal into clean and dirty components and separately burning and utilizing them in the production of electrical power.

In accordance with a primary aspect of the present invention, a combined cycle power plant includes means for separating coal into clean and dirty components, the clean component is burned in a conventional combustor for producing clean high temperature gasses for powering a gas turbine, the dirty component is burned in a fluid bed combustor for generating steam for powering a steam generator, and a portion of the output from the conventional combustor is combined with the output from the fluid bed combustor to power one or more steam turbines.

BRIEF DESCRIPTION OF THE DRAWING

The above and other objects of the present invention will become apparent from the following description when read in conjunction with the drawings wherein.

DETAILED DESCRIPTION OF A PREFERRED EMBODIMENT

Figure 1:
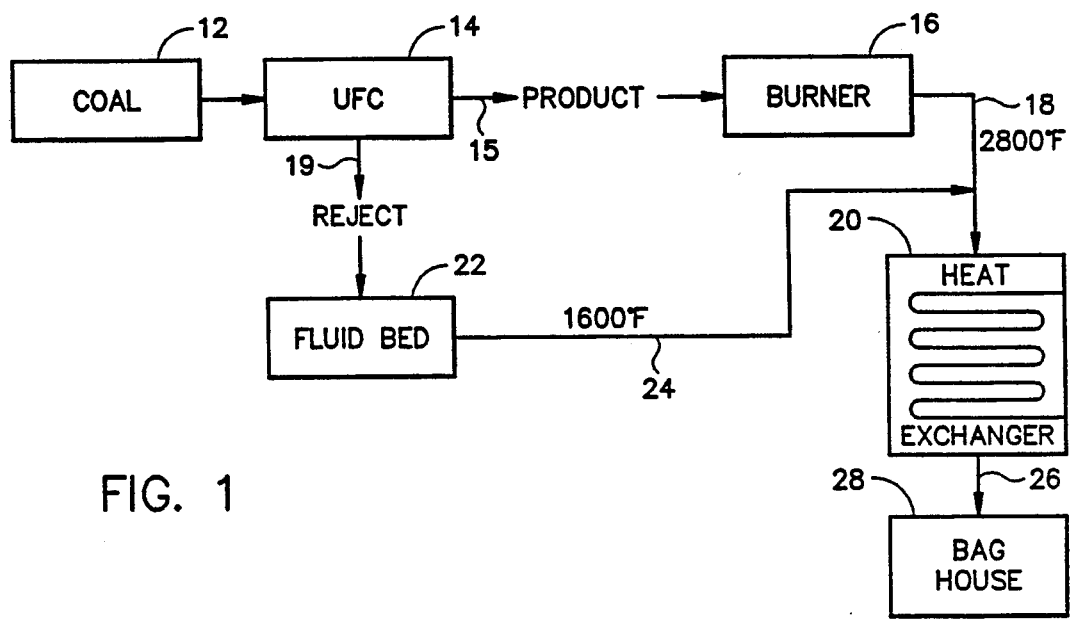
FIG. 1 is a schematic illustration of an exemplary embodiment of fuel combustion system of the invention.

Referring to FIG. 1 of the drawing, a combustion portion of a power plant system in accordance with the present invention is schematically illustrated. The illustrated combustion system is for a power plant designed to receive a low grade coal or the like, process it into a clean fuel component and a dirty fuel component, burn them in suitable separate parallel combustion systems, and combine some of the heat or energy outputs. The general terms "heat" and "energy" are considered the equivalent as used herein. The plant is designed to utilize both gas turbines and steam turbines, with maximum efficiency in the conversion of the coal components of fuel to power.

Figure 2:
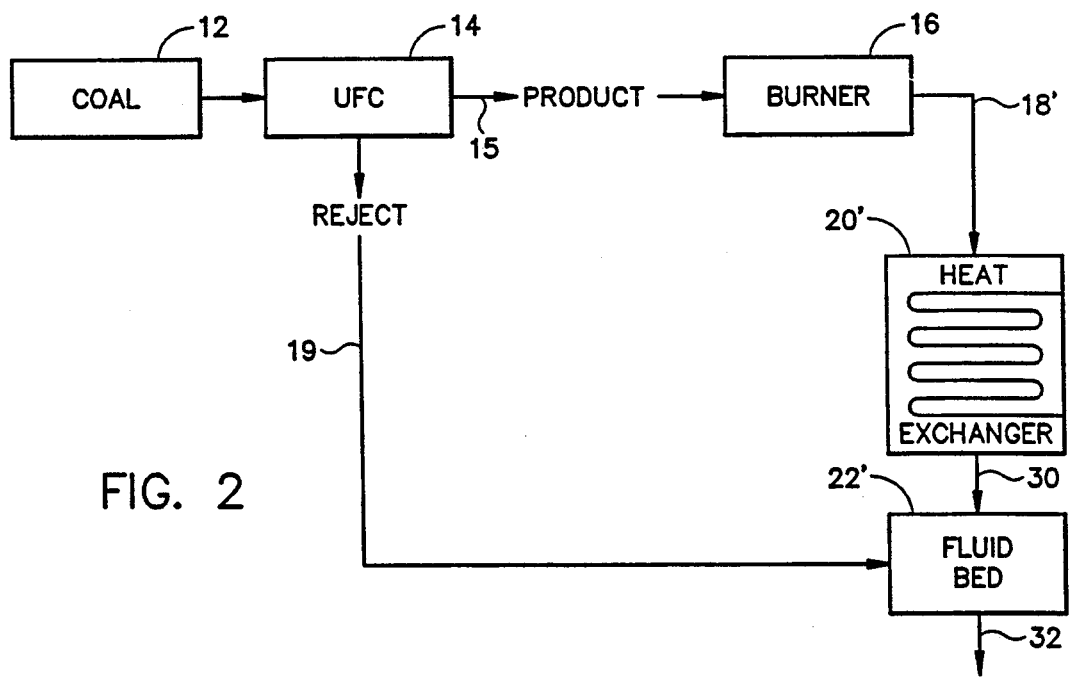
FIG. 2 is a schematic illustration of an alternate embodiment of the fuel combustion system of the invention.

As illustrated in FIGS. 1 and 2, the system has a source of coal 12, which is fed by conventional means, such as a conveyer or the like, into a benefication processing unit, preferably of the ultra fine cleaning (UFC) type 14 for cleaning and separating a clean fuel from the supply, leaving what will be termed a dirty or normally reject fuel. The dirty fuel may contain any number of non-combustible impurities or components that either produce pollutants or a high percentage of ash or both.

The source of coal 12 is preferably a low grade of coal not otherwise suitable for burning in conventional burners. Vast amounts of coal of this type are available throughout this country, particularly in the Mid-West. Recent technology has been developed that is capable of separating a high purity component of fuel from these coals that can be burned in conventional suspension burners. This leaves a dirty or reject fuel component containing a high percentage of impurities that must be either discarded or burned in a fluidized bed combustor. The coal can be delivered directly from a mine without the necessity of extensive preprocessing. This can save in handling and processing costs and enhance the economies of the system and process.

The processing unit 14 is preferably of an ultra fine cleaning dry process system, which cleans by an electrostatic separation, such as disclosed in U.S. Pat. No. 4,839,032 entitled "Separating Constituents of a Mixture of Particles", granted Jun. 13, 1989 to Whitlock, which is incorporated herein by reference as though fully set forth. The term "UFC" is an acronym for "ultra fine cleaning". In accordance with this system and process, the coal is ground or crushed into a fine powder and separated into a substantially pure coal component and a normal reject component, including higher concentrations of sulfur, mineral and ash. Thus, coal with a normal ash content of ten to twelve percent and a sulfur content of about three and one-half percent may produce on the order of fifty-fifty clean fuel and dirty fuel, with the clean fuel having an ash content of on the order of five to six percent and a sulfur content of about one and one-half to two percent. The dirty or reject fuel may have an ash content of twenty percent to thirty percent and sulfur content of ten to fifteen percent or more. The processing and separating unit 14 may be set up to make two or more refining or separation passes.

The clean fuel or product is fed by suitable feed means into a conventional burner, such as a suspension burner 16, producing hot gases on the order of twenty-eight hundred degrees F. These hot combustion gases are then passed along a duct system 18 to a heat exchanger 20, where the heat is recovered either by a heated gas or steam or a combination thereof. In the preferred form, the majority of heat is recovered by heating a clean compressed gas or air for use in powering a gas turbine. A substantial portion of the remainder of the heat is used to heat steam for powering a steam turbine.

The reject or dirty fuel is passed along a parallel path to a fluidized bed combustor 22, where the combustion produces hot gases of approximately sixteen-hundred degrees Fahrenheit. These hot combustion gases are passed along a duct 24, and combined with the suspension burner gases at the inlet to the heat exchanger 20. The combined heat or energy is recovered in the exchanger 20 by heating a clean compressed air or gas to a high temperature for powering a gas turbine. Additional heat may be recovered for generating steam for powering a steam turbine. The flue gases containing ash and other waste products of combustion are passed via duct 26 to a bag house (i.e., filters) for removal of ash and like, which is disposed of in the usual manner. Further heat or energy may be recovered from these exhaust gases in a steam generator producing steam for powering a steam turbine.

Fluidized bed combustors utilize a bed of granular inert and sorbent material, which is maintained in a fluidized state by passage of air flow therethrough. Such fluidized beds are useful in burning of solids or very heavy fuel oils. Examples of such combustors are disclosed in U.S. Pat. No. 4,388,877, issued Jun. 21, 1983 to Molayem et al., and U.S. Pat. No. 4,597,362, issued Jul. 1, 1986 to Daudet et al., both of which are incorporated herein by reference as though fully set forth.

Referring to FIG. 2, a slightly different arrangement is illustrated wherein like elements are identified by like numerals, and wherein equivalent components are identified by the same numbers primed. The output from the suspension burner 16 is fed directly by way of duct system 18' to heat exchanger 20' where clean gasses are heated for powering a gas turbine. In this arrangement, the exhaust gases from the heat exchanger 20', having given up the majority of the heat therein to a fluid in the heat exchanger 20', are then fed by duct system 30 to the fluid bed combustor 22', where they are used as over fire gases. This again results in a combining of the heated gases from the combustion of the two products of the coal. The heated gases from the fluid bed combustor 22' then may be fed by suitable duct system 32 to a second or further heat exchanger, not shown, for generating steam for powering a steam turbine driving a generator. The energy thus produced is used to power both gas and steam turbines to generate electric power.

Figure 3:
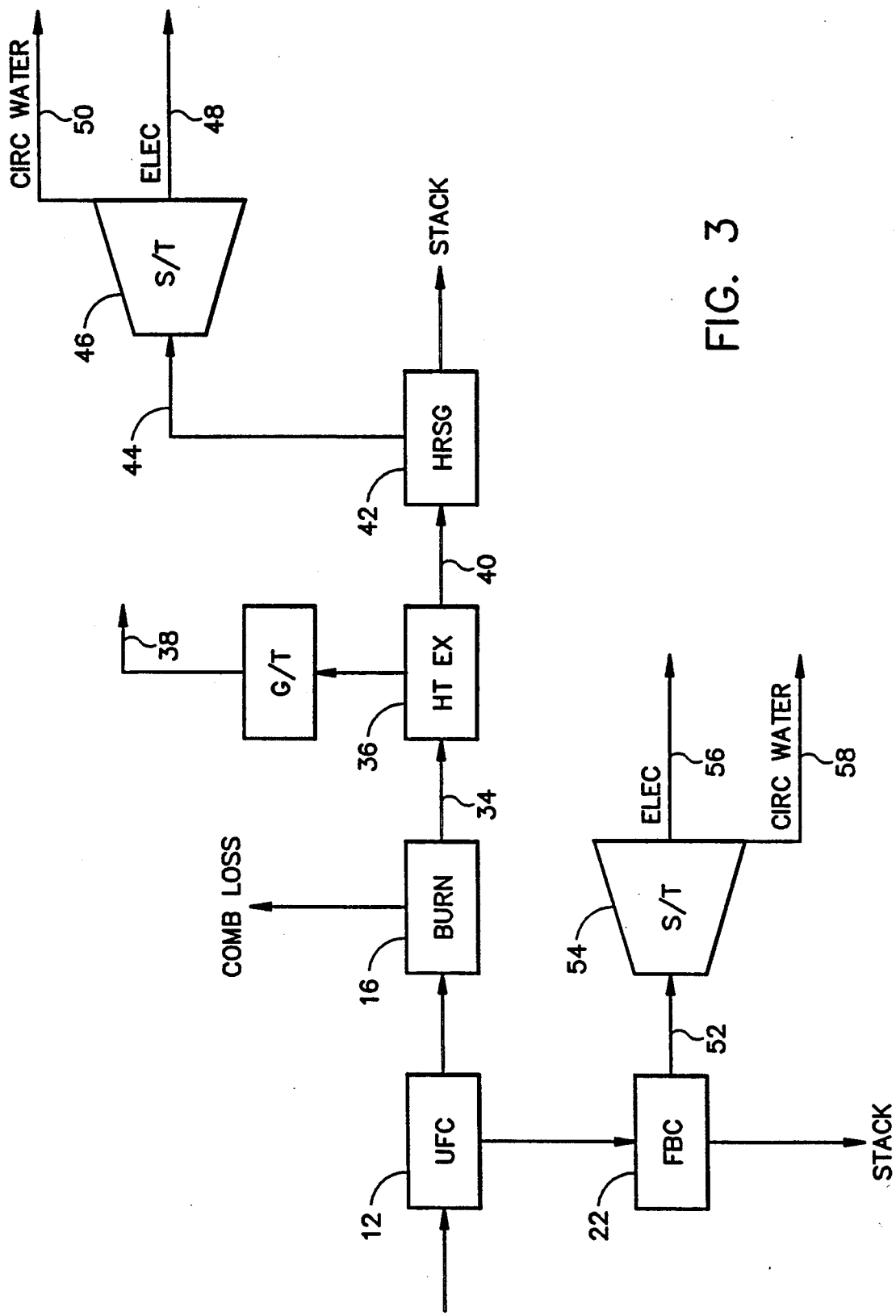
FIG. 3 is a schematic illustration of an exemplary embodiment of a power system plant in accordance with the invention.

Referring to FIG. 3, a more complete system is illustrated, wherein again like elements or components of the system are identified by like reference numerals, and similar or equivalent elements by the numbers primed. In this arrangement, hot gases from the suspension burner 16 are fed by ducts or conductors 34 to a heat exchanger 36, a second working fluid, such as a compressed gas or air, is heated and passed onto and powers a gas turbine, producing and distributing electricity by way of an output terminal 38. Exhaust gases from the heat exchanger 36 are fed by way of duct 40 to a heat recovery steam generator (HRSG) 42, producing steam for operation of a steam turbine, which is fed by steam lines 44 to steam turbine generator 46 for producing additional electric power provided by outlet terminal 48. The exhaust water or steam from the steam turbine may be utilized via line 50 as reheater hot water or for other heating purposes.

Hot gases produced by the fluid bed combustor 22 are fed through heat exchanger, producing steam fed via steam lines 52 to a steam turbine 54 for producing electric power by way of output 56. The electric power from this and the other outputs may be combined, providing approximately 41.9 percent fuel conversion efficiency. Energy from the circulating hot water from the steam turbine 54 may be utilized via conduits 58 for heating or other like purposes.

Figure 4:
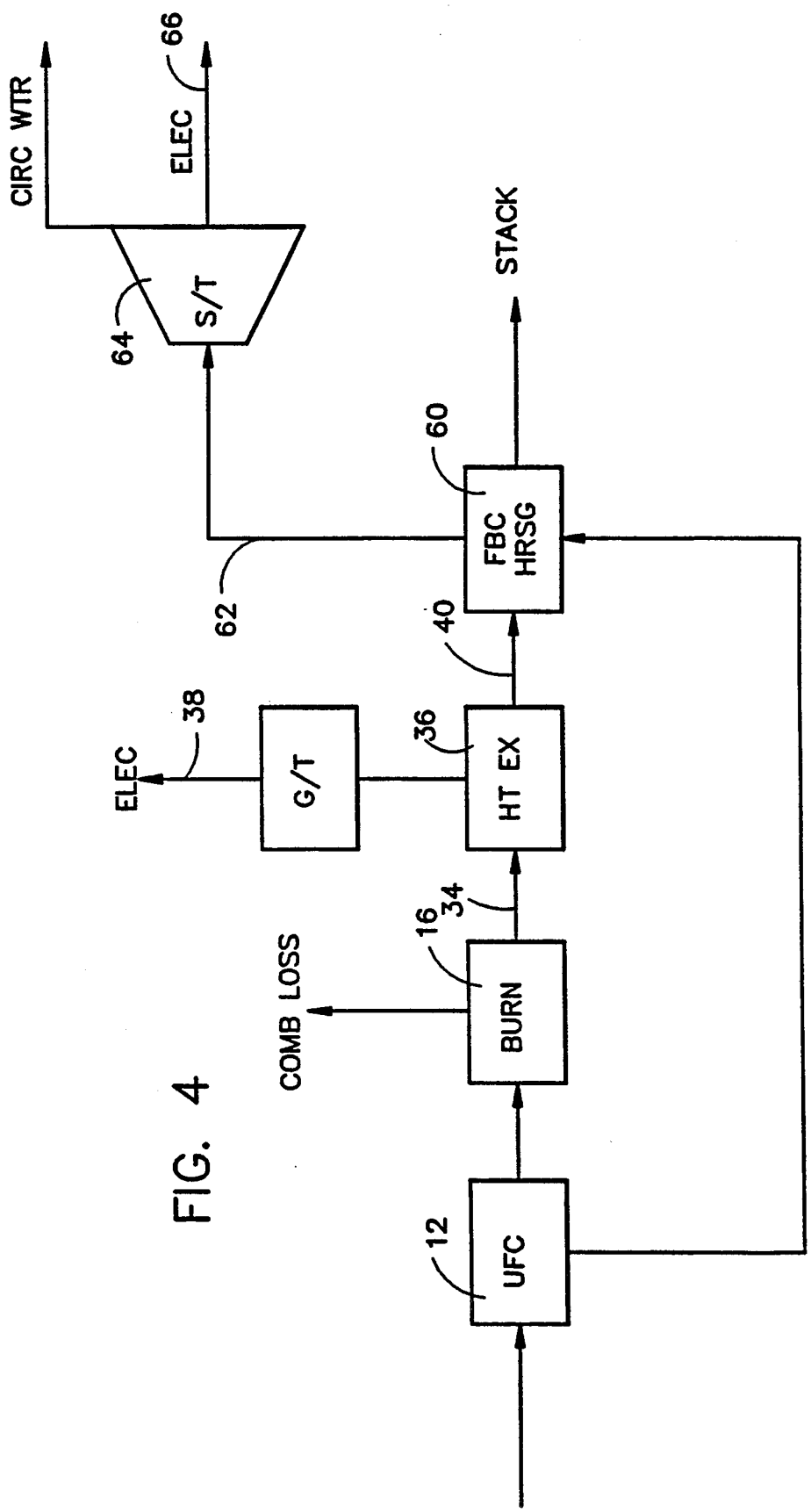
FIG. 4 is a schematic illustration of a complete power incorporating the combustion embodiment of FIG. 2.

Referring to FIG. 4, a more complete power system embodies the combustion system of FIG. 2, wherein again like elements or components are identified by the same reference numerals. In this embodiment, clean fuel or coal is burned in the suspension burner combustor 16, passed to a heat exchanger as gas, heat exchanged to a second working fluid, such as a gas for powering gas turbine 36. The gas turbine drives a generator producing electrical power available at terminal 38. The exhaust gases 40 are fed to fluid bed combustor 60 as, for example, over fire gases for the fluid bed combustor of the heat recovery steam generator 60. The latter produces steam for a steam turbine via steam feed lines 62 to steam turbine 64, which produces electrical power at terminal 66. With this arrangement, one gets approximately 27.2 percent efficiency with the electrical output at the gas turbine 36, with 14.7 percent electrical output at the steam turbine 64, for a total combined efficiency of 41.9 percent. Thus, the combined efficiency of the system, utilizing both the clean fuel and the dirty or waste fuel, provides a system having an attractive overall efficiency.

Figure 5:
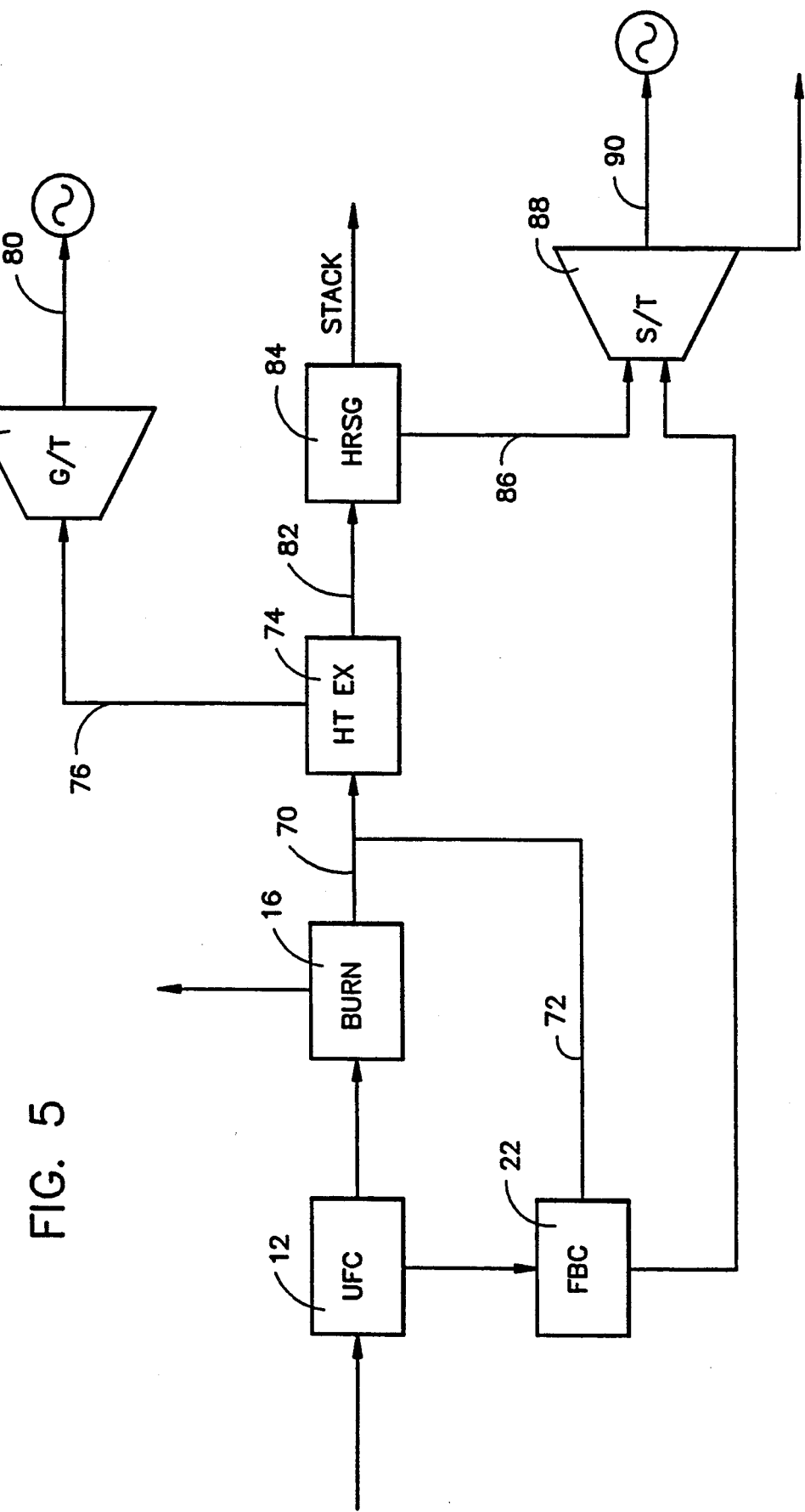
FIG. 5 is a schematic illustration of a complete power plant embodying the combustion system of FIG. 1.

Referring to FIG. 5 of the drawings, a complete power plant embodies the combustion system of FIG. 1, wherein like components of the system are identified by the same reference numerals. In this embodiment, the clean fuel is burned in the combustor 16, and then fed by way of ducts 70, where it is combined with gases from the fluid fed combustor 22 by way of ducts 72 prior to introduction into a heat exchanger 74, with approximately 95.7 percent of the energy being introduced therein. The heated gases are then directed by ducts or passages 76 to a gas turbine 78, producing electrical power at a terminal 80 with 32.7 percent efficiency. The heat exchanger 74 produces gases fed by ducts 82 to HRSG 84 wherein steam is produced and fed by lines 86 to steam turbine 88, producing electrical power at output terminal 90, with approximately 10.9 percent efficiency at the steam turbine. The total efficiency with this arrangement is estimated at 43.6 percent conversion of the fuel.

In operation, quantities of low grade coal are delivered to a power plant having a system, as described above, for converting low grade coal to electrical power, comprising means for processing a quantity of coal into a first component of high grade coal and a second component of low grade coal. The coal is first processed into the components, and fed by way of separate paths into first combustor means for burning the high grade coal, and a second combustor means for burning the low grade coal. The separate hot gases produced by the separate burning of the components of the coal are then used to separately power a gas turbine and a steam turbine for producing useful electrical power.

These systems, in accordance with the invention, take a coal and process it into its separate clean and dirty components, and then simultaneously burn the coal in separate parallel combustors, and separately power a gas turbine and combine portions of the energy outputs down the line for powering a steam turbine. This combination of gas cycle and steam cycle provides a relatively high efficiency system. These arrangements can make the processing and burning of normally low quality coal and the like economically and environmentally practical.

The invention enables the construction of a power plant to have a high efficiency gas cycle and a lower efficiency steam cycle powered by low grade coal. The plant can be constructed with a lower capacity portion being the high cost fluidized bed system and still handle a high volume of low grade coal. These systems, in accordance with the invention, enable all of the low grade coal to be used to produce useable power at a reasonably high efficiency, low cost and still meet environmental regulations.

While we have illustrated and described our invention by means of specific embodiments, it is to be understood that numerous changes and modifications may be made therein without departing from the spirit and scope of the invention as defined in the appended claims.

We claim:

1. A power plant having a system for processing and converting low grade coal to power, comprising:
    a gas turbine for powering a first generator for generating electrical power;
    a steam turbine for powering a second generator for generating electrical power;
    means for processing a quantity of a low grade coal into a first component of high grade coal and a second component of low grade coal;
    first combustor means for burning said high grade coal for heating a gas for powering said gas turbine; and
    second combustor means for burning said low grade coal for producing steam for powering said steam turbine.

2. A power plant according to claim 1 wherein:
    said first combustor means is a suspension burner combustor; and
    said second combustor means is a fluidized bed combustor.

3. A power plant according to claim 1 wherein a portion of heat produced by said first combustor is used to produce steam for powering said steam turbine.

4. A power plant having a system for processing and converting low grade coal to power, comprising:
    a gas turbine for powering a first generator for generating electrical power;
    a steam turbine for powering a second generator for generating electrical power;
    means for processing a quantity of a low grade coal into a first component of high grade coal and a second component of low grade coal;
    first combustion means for burning said high grade coal for heating a gas for powering said gas turbine; and second combustion means for burning said low grade coal for producing steam for powering said steam turbine, wherein a portion of heat produced by aid first combustion means is combined with heat produced by said second combustion means.

5. A power plant
having a system for processing and converting low grade coal to power, comprising:
a gas turbine for powering a first generator for generating electrical power;
a steam turbine for powering a second generator for generating electrical power;
means for processing a quantity of a low grade coal into a first component of high grade coal and a second component of low grade coal;
first combustor means for burning said high grade coal for heating a gas for powering said gas turbine;
second combustor means for burning said low grade coal for producing steam for powering said steam turbine; and
means for combining heat from said combustor means, first means responsive to a first portion of said heat for powering a gas turbine, and second means responsive to a second portion of said heat for powering a steam turbine.

6. A power plant according to claim 5 wherein said second means comprises a heat recovery steam generator for generating steam for powering a steam turbine.

7. A power plant according to claim 1 wherein a first portion of heat generated in said first combustion means is transferred to a first gas in a first heat exchanger for heating said gas for powering said gas turbine, and a second portion of said heat is transferred to a heat recovery steam generator for generating steam for powering a steam turbine.

8. A power plant
having a system for processing and converting low grade coal to power, comprising;
a gas turbine for powering a first generator for generating electrical power;
a steam turbine for powering a second generator for generating electrical power;
means for processing a quantity of a low grade coal into a first component of high grade coal and a second component of low grade coal;
first combustion means for burning said high grade coal for generating heat for heating a gas for powering said gas turbine; and
second combustion means for burning said low grade coal for generating heat for producing steam for powering said steam turbine,
wherein a first portion of heat generated in said first combustion means is transferred to a first gas in a first heat exchanger for heating said gas for powering said gas turbine, and a second portion of said heat is transferred to a heat recovery steam generator; and
combined with heat from said second combustion means at said heat recovery steam generator for generating steam for powering a steam turbine.

9. A combined gas cycle and steam power plant having means for processing and converting low grade coal to power, comprising:
a gas turbine for powering a first generator for generating electrical power;
a steam turbine for powering a second generator for generating electrical power;
means for grinding a stream of cool into fine powder;
means for separating said fine powder coal into a high grade coal and a low grade coal;
a suspension burner for burning said high grade coal for generating a first heat;
means for converting said first heat from said suspension combustor for powering a gas turbine;
a recirculating combustor burner for burning said low grade coal for producing a second heat;
means for converting said second heat from said fluidized bed combustor for powering a steam turbine; and
means for combining at least a portion of said first heat with said second heat for powering at least a steam turbine.

10. A power plant according to claim 9 wherein said means for combining comprises a heat recovery steam generator for receiving the said portion of said first heat for generating steam for powering said steam turbine.

11. A combined gas cycle and steam power plant having means for processing and converting low grade coal to power, comprising;
a gas turbine for powering a first generator for generating electrical power;
a steam turbine for powering a second generator for generating electrical power;
means for grinding a stream of coal into fine powder;
means for separating said fine powder coal into a high grade coal and a low grade coal;
a suspension burner for burning said high grade coal for generating a first heat;
means for converting said first heat from said suspension burner for powering a gas turbine;
a recirculating fluid bed combustion burner for burning said low grade coal for producing a second heat;
means for converting said second heat from said fluid bed combustion burner for powering a steam turbine; and
means for combining at least a portion of said first heat with said second heat for powering at least a steam turbine,
said means for combining comprising a heat recovery steam generator for receiving the said portion of said first heat for generating steam for powering said steam turbine,
wherein said means for converting said heat comprises a common heat exchanger for combining heat from both said burners.

12. A power plant according to claim 11 wherein said means for converting said heat comprises a first heat exchanger for said first burner and a second heat exchanger for said second burner.

13. A method of establishing and operating a power plant for the conversion of a coal to maximum energy, comprising the steps of:
providing a gas turbine for powering a first generator for generating electrical power;
providing a steam turbine for powering a second generator for generating electrical power;
providing a suspension combustor for burning a high grade coal;
providing a fluidized bed combustor for burning a low grade coal;
selecting a quantity of a low grade coal;
reducing said coal to a fine powder;

separating said fine powder into a first component of high grade coal and a second component of low grade coal;

burning said first component of said coal in said suspension combustor for generating a first gas stream of a first temperature;

burning said second component of said coal in said fluidized bed combustor for generating a second gas stream of a second temperature;

powering said gas turbine by means of said first gas stream; and powering said steam turbine by steam generated by said second gas stream.

14. A process for the conversion of a coal to maximum energy, according to claim 13 wherein the step of powering a gas turbine with said first gas stream includes passing said first gas stream through a heat exchanger for heating a compressed gas for said turbine, and the step of powering a steam turbine with said second gas stream includes the step of generating steam with said second gas stream.

15. A process for the conversion of a coal to maximum energy, according to claim 14 wherein the step of powering a steam turbine with said second gas stream includes the step of combining a portion of the heat from said first gas stream with heat from said second gas stream.

16. A method of establishing and operating a power plant for the conversion of a coal to maximum energy, for the conversion of a coal to maximum energy, comprising the steps of:

providing a gas turbine for powering a first generator for generating electrical power;

providing a steam turbine for powering a second generator for generating electrical power;

providing a suspension combustor for burning a high grade coal;

providing a fluidized bed combustor for burning a low grade coal;

selecting a quantity of a low grade coal;

reducing said coal to a fine powder;

separating said fine powder into a first component of high grade coal and a second component of low grade coal;

burning said first component of said coal in said suspension combustor for generating a first gas stream of a first temperature;

burning said second component of said coal in said fluidized bed combustor for generating a second gas stream of a second temperature;

powering said gas turbine by means of said first gas stream, and powering said steam turbine by steam generated by said second gas stream, wherein the step of powering a gas turbine with said first gas stream includes passing said first gas stream through a heat exchanger for heating a compressed gas for said turbine, and the step of powering a steam turbine with said second gas stream includes the step of generating steam with said second gas stream, wherein the step of powering a steam turbine with said second gas steam includes the step of combining a portion of the heat from said first gas stream with heat from said second gas stream, and wherein the step of combining a portion of the heat from said first gas stream with heat from said second gas stream is carried out in a heat recovery steam generator and passing said combined gas stream through a heat recovery steam generator for producing a steam for powering at least one steam turbine.

17. A process for the conversion of a coal to maximum energy, according to claim 14 wherein the steps of powering said gas turbine by means of said first gas stream, and powering said steam turbine by steam generated by said second gas stream is preceded by a step of combining said gas streams.

18. A process according to claim 13 wherein the steps of burning said first component and said second component is carried out by simultaneously feeding said high grade coal to said suspension burner combustor and said low grade coal to said fluidized bed combustor.

* * * * *